United States Patent
Chen et al.

(10) Patent No.: US 10,581,361 B2
(45) Date of Patent: Mar. 3, 2020

(54) MULTIPLE INVERTER SYSTEM FOR AN ELECTRIC MACHINE

(71) Applicant: Ford Global Technologies, LLC, Dearborn, MI (US)

(72) Inventors: Lihua Chen, Farmington Hills, MI (US); Baoming Ge, Okemos, MI (US); Shuitao Yang, Dearborn Heights, MI (US); Shahram Zarei, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/407,296

(22) Filed: Jan. 17, 2017

(65) Prior Publication Data

US 2018/0205340 A1 Jul. 19, 2018

(51) Int. Cl.
  *H02M 7/537* (2006.01)
  *H02P 25/22* (2006.01)
  *H02P 29/50* (2016.01)
  *H02P 27/08* (2006.01)

(52) U.S. Cl.
  CPC .............. *H02P 25/22* (2013.01); *H02P 27/08* (2013.01); *H02P 29/50* (2016.02); *Y02T 10/7258* (2013.01)

(58) Field of Classification Search
  USPC ... 318/496, 400.17, 400.2, 400.26, 801, 599
  See application file for complete search history.

(56) References Cited

U.S. PATENT DOCUMENTS

| | | | | |
|---|---|---|---|---|
| 3,781,615 | A | * | 12/1973 | Mokrytzki ................. 318/801 |
| 6,043,624 | A | * | 3/2000 | Masaki ................. H02P 21/22 |
| | | | | 318/722 |
| 6,392,905 | B1 | | 5/2002 | Huang et al. |
| 6,430,213 | B1 | * | 8/2002 | Dafesh ................. H04B 1/7075 |
| | | | | 375/146 |
| 6,486,632 | B2 | * | 11/2002 | Okushima ............ B60L 11/123 |
| | | | | 318/151 |
| 7,425,806 | B2 | | 9/2008 | Schnetzka et al. |
| 8,471,518 | B2 | * | 6/2013 | Nishiguchi ........... B60L 11/123 |
| | | | | 318/800 |
| 8,648,559 | B2 | | 2/2014 | Singh |
| 9,641,034 | B2 | * | 5/2017 | Ito ........................... H02K 3/12 |
| 2014/0198542 | A1 | * | 7/2014 | Swamy ............... H02M 1/4225 |
| | | | | 363/37 |

(Continued)

OTHER PUBLICATIONS

A Carrier-Based Neutral Voltage Modulation Strategy for Multilevel Cascaded Inverters Under Unbalanced DC Sources by Younghoon Cho, Member, IEEE, Thomas LaBella, Student Member, IEEE, Jih-Sheng Lai, Fellow, IEEE, and Matthew K. Senesky, Member, IEEE; (Year: 2014).*

*Primary Examiner* — Muhammad S Islam
(74) *Attorney, Agent, or Firm* — Brooks Kushman P.C.; David Kelley

(57) ABSTRACT

A vehicle may include an electric machine including windings having a nonzero phase offset. The vehicle may further include first and second inverters configured to drive the electric machine as a result of toggling of switches. The switches may be toggled according to respective pulse width modulation (PWM) signals. One or more gate drivers may be configured to generate the PWM signals. The PWM signals may be based on fundamental waveforms having a phase shift that is based on the nonzero phase offset of the electric machine.

17 Claims, 4 Drawing Sheets

(56) References Cited

U.S. PATENT DOCUMENTS

| | | | |
|---|---|---|---|
| 2015/0311819 A1* | 10/2015 | Matsumoto | H02M 1/14 |
| | | | 363/97 |
| 2016/0094163 A1* | 3/2016 | Takahashi | H02P 27/08 |
| | | | 318/400.06 |
| 2016/0200355 A1* | 7/2016 | Mori | B62D 5/0484 |
| | | | 180/446 |
| 2017/0133946 A1* | 5/2017 | Wagoner | H02M 7/5395 |
| 2017/0166069 A1* | 6/2017 | Jojima | B60L 50/51 |

\* cited by examiner

MULTIPLE INVERTER SYSTEM FOR AN ELECTRIC MACHINE

TECHNICAL FIELD

The present disclosure relates to a multiple inverter system for an electric machine.

BACKGROUND

Electric machines operate based on magnetic fields. Magnetic fields are generated based on the magnitude of electric current flowing through machine windings. Meaning, increased current flow improves the power available to electric machines. In order to increase the current flow, inverters demand more input current. Increased current demand by inverters may subject DC busses powering the inverters with increased fluctuating current, which may require larger bus capacitors or other equipment to compensate.

SUMMARY

A vehicle may include an electric machine including windings having a nonzero phase offset. The vehicle may further include first and second inverters configured to drive the electric machine as a result of toggling of switches. The switches may be toggled according to respective pulse width modulation (PWM) signals. One or more gate drivers may be configured to generate the PWM signals. The PWM signals may be based on fundamental waveforms having a phase shift that is based on the nonzero phase offset of the electric machine.

An electric drive system may include a DC link capacitor and a first inverter configured to draw power from the capacitor and having switches toggled by a gate driver. The gate driver may be configured to generate a first pulse width modulation (PWM) signal. The pulse width modulation signal may be based on a first carrier waveform modulated by a first fundamental waveform. The electric drive system may further include a second inverter configured to draw power from the capacitor and having switches toggled by the gate driver. The gate driver may be configured to generate a second PWM signal. The second PWM signal may be based on a second carrier waveform being phase offset from the first carrier waveform and modulated by a second fundamental waveform phase offset from the first fundamental waveform.

A vehicle may include an electric machine having windings. The vehicle may also include a pair of inverters drawing power from a common DC bus and configured to output alternating currents to the windings. The vehicle may also include a pair of gate drivers configured to offset respective phases of carrier waves associated with each of the gate drivers based on a speed and phase offset of the electric machine. The offset may be in response to a projected ripple current of the common DC bus exceeding a threshold.

DETAILED DESCRIPTION

Figure 1:
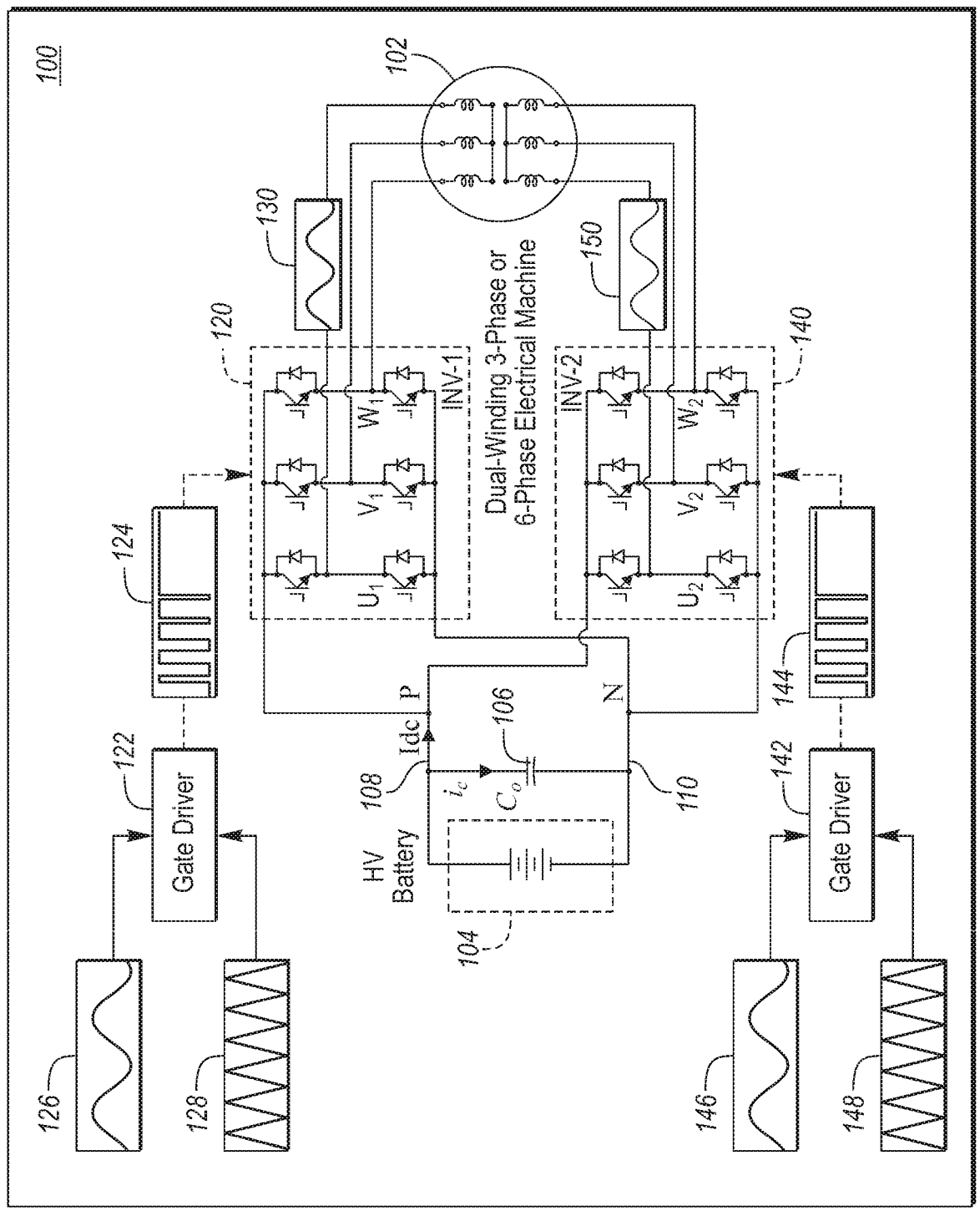
FIG. 1 is an schematic diagram of a vehicle having an electric drive system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An electric machine may require alternating current. Because battery storage of electricity is generally direct current, inverters may be implemented between the electric machines and the batteries to ensure that electric machine current is in the required form regardless of the input current. A DC bus capacitor may be connected in parallel with the inverters and direct current sources to absorb current fluctuations as switches of the inverters are actuated. In some cases, multiple inverters may be used to reduce the magnitude of inverter and electric machine winding currents. Each inverter output may correspond to individual electric machine windings. The increased current demand by the inverters may require a larger, more costly DC bus capacitor to maintain bus voltages and meet current dynamic demands due to inadequate current response from the battery, also reduce current fluctuations going into the battery.

Inverter switches may be driven by a PWM signal. Switch output is used to drive the electric machine. The PWM signal may be generated from a carrier wave and a fundamental or reference wave. Characteristics of the PWM signal may be altered to diminish the current ripple of the DC bus. To generate the PWM signal, the carrier wave may be a triangle wave, sawtooth wave, or other waveform. The fundamental wave may be a sinusoidal wave corresponding to the waveform required by the electric machine. The frequency of the fundamental wave may be adjusted to change the operating speed of the electric machine. The peak-to-peak magnitude of the fundamental wave may be adjusted to change the modulation index, thereby changing inverter output voltage.

Anticipated or measured current consumption can be used to estimate a power factor for each phase. Power factor may be corrected using the fundamental wave, modulation index, or other methods.

As stated above, characteristics of the PWM signal may be altered to diminish the current ripple of the DC bus. One such characteristic is the timing of the duty cycle for each phase of the inverters (e.g., U, V, W). Offsetting the actuation of the switches may diminish the current ripple of the DC bus by dispersing the current demand of the inverter. For example, the PWM signal from one gate driver may be delayed and used as the PWM signal for the other gate driver. This delay may shift the phases of respective inverter outputs. The size of the delay may be based on the desired speed or phase offset of the electric machine.

Offsetting the actuation of the switches can be achieved by more than a time-adjusted shift of the PWM signal. For instance, the fundamental waveforms for each inverter phase may be offset from the respective phase of the other inverter. Meaning, fundamental waveforms sent to the respective gate drivers for Phase A of each inverter are offset with respect to one another. The offset may be equal to or based on an offset of the electric machine windings. Fundamental waveforms sent to the respective gate drivers for other phases may have an equal phase offset.

In another or the same embodiment, a phase offset of the carrier waves can be implemented to offset the actuation of the switches. For instance, the carrier waveforms for each inverter phase may be offset from the respective phase of the other inverter. Meaning, carrier waveforms sent to the respective gate drivers for Phase A of each inverter are offset with respect to one another. The offset may be based on the frequency or phase offset of the associated fundamental waveform. For example, a carrier wave may be offset from the corresponding phase of the other inverter by 80° when the fundamental waveform has a frequency of 100 Hz or phase offset of zero degree. The offset may be adjusted at a given frequency or speed based on the power factor of the phase or the phase offset and the modulation index of the fundamental waveform. A lookup table, database, or algorithm may be used or employed to determine the optimized phase offset between the carrier waves. The lookup table may associate the root mean square (RMS) capacitor current ripple and the carrier wave offset with other factors (e.g., modulation index, power factor, phase offset of fundamental waveforms) to minimize the current ripple under the enumerated conditions. For example, a lookup in the table at a particular speed may have more than one recommended phase offset value. The other parameters in the table may be used to determine the best phase offset value. The optimization process provides minimal current ripple at a given speed with a power factor near unity.

Now referring to FIG. 1, an electric drive system for a vehicle 100 is shown. The drive system includes an electric machine 102 having dual three-phase windings or six phase windings. The electric machine may have any number of phases or windings. For example, a two winding machine could have each winding fed by a respective inverter and embody the teachings of this disclosure. The windings may have a nonzero phase offset incorporated into the construction of the machine. The vehicle also includes a traction battery 104. The traction battery 104 may be any type of physical or chemical composition to create a direct current. The battery may also be a generic DC source. The traction battery 104 is connected in parallel with an output or direct current (DC) link capacitor 106. The capacitor 106 smooths line voltage perturbations and ensures fast current response from the DC bus 108, 110 having a positive rail 108 and negative rail 110. The capacitor 106 and battery 104 are connected in parallel with inverters 120, 140 that draw power from the DC bus 108, 110. As shown, each inverter has three phases $U_1$, $V_1$, $W_1$, $U_2$, $V_2$, and $W_2$ offset by 120°. Each phase has a pair of IGBT switches to convert the direct current to alternating current. The switches include blocking diodes. The switches are operated by gates. The gates may actuate based on a voltage or current change. For example, the gate driver or drivers 122, 142 associated with each inverter 120, 140 may generate respective PWM signals 124, 144 for each gate as necessary. The PWM signals 124, 144 may be generated by modulation of respective carrier waveforms 128, 148 by respective fundamental waveforms 126, 146. The PWM signals 124, 144 are used to drive gates of each of the switches to generate output waveforms 130, 150 used by the electric machine 102.

Figure 2:
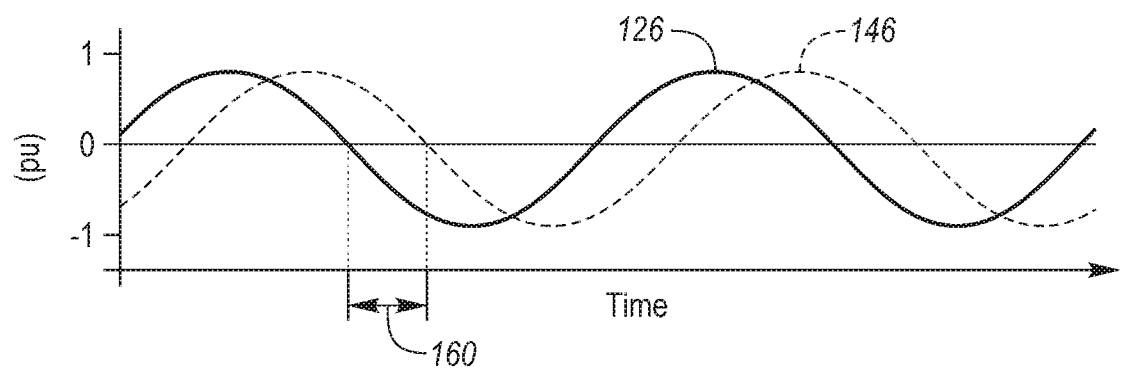
FIG. 2 is a graph showing two fundamental waveforms having a phase offset.

Now referring to FIG. 2, a graph is shown. The graph has fundamental waveforms 126, 146. The fundamental waveforms may correspond to respective fundamental waves used to generate PWM signals for corresponding phases of each inverter. For example, fundamental waveforms 126, 146 may be used to generate PWM signals for $U_1$ and $U_2$. The fundamental waveforms 126, 146 may have a nonzero phase offset 160. The nonzero phase offset 160 may correspond to the phase offset of phase windings of the electric machine 102 of FIG. 1.

Figure 3:
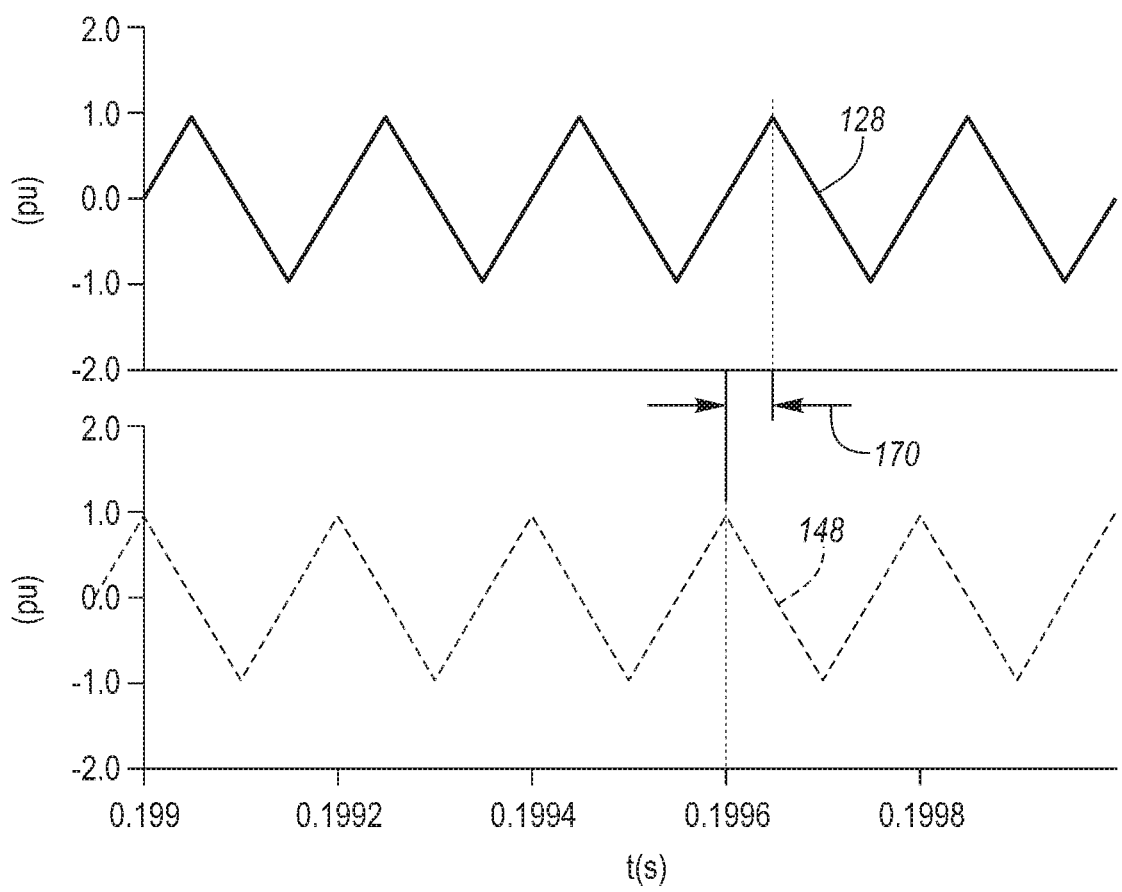
FIG. 3 is a graph showing two carrier waveforms having a phase offset.

Now referring to FIG. 3, a graph is shown. The graph has carrier waveforms 128, 148. The carrier waveforms may correspond to respective carrier waves used to generate PWM signals for each inverter. For example, carrier waveforms 128, 148 may be used to generate PWM signals for $U_1$ and $U_2$ or $U_1$, $V_1$, $W_1$, $U_2$, $V_2$, and $W_2$. The carrier waveforms 128, 148 may have a nonzero phase offset 170. The nonzero phase offset 170 may correspond to the frequency or and phase shift of the fundamental waveforms 130, 150 of the electric machine 102 of FIG. 1.

Figure 4:
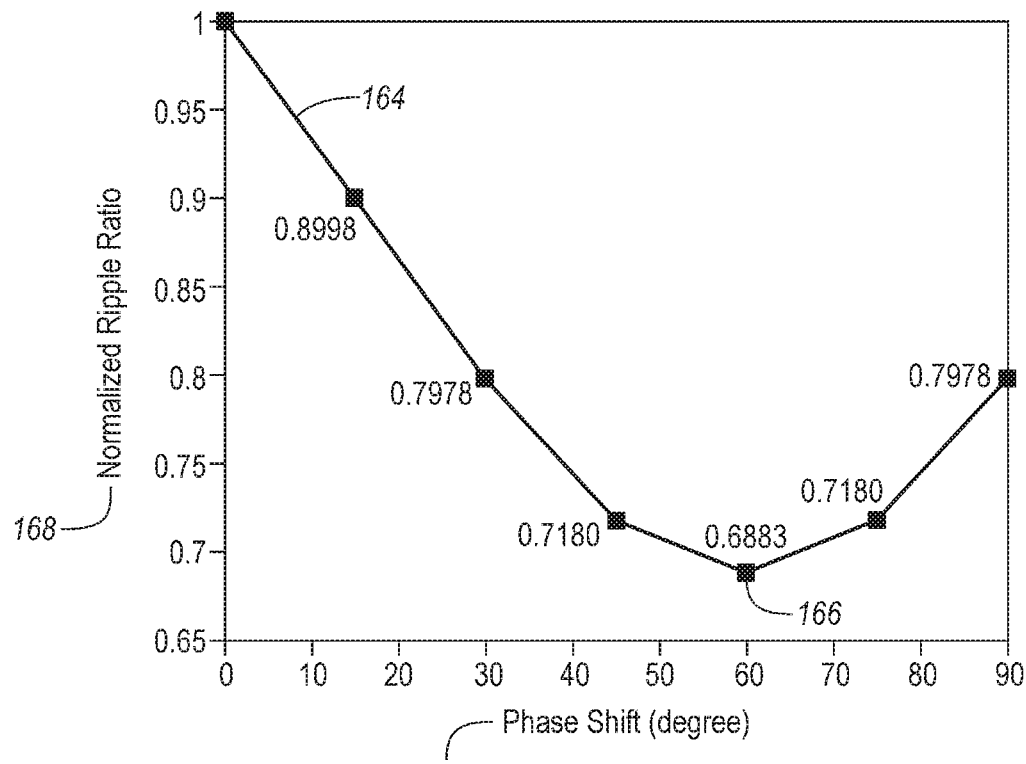
FIG. 4 is a graph showing a minimum normalized current ripple ratio over various fundamental waveform phase offsets.

Now referring to FIG. 4, a graph is shown. The graph includes a normalized ripple ratio curve 164 corresponding to various phase offsets 160 and the respective normalized ripple ratio 168 at the given offsets 160. The normalized ripple ratio is calculated as an absolute value of the RMS current ripple through the DC bus divided by the absolute value of the RMS current ripple through the DC bus having a zero degree carrier shift and a zero degree phase shift of the fundamental waveform. As shown, an optimal fundamental waveform phase offset is 60°. Meaning, the fundamental for $U_1$ is offset from the fundamental of $U_2$ by 60° to minimize ripple current.

Figure 5:
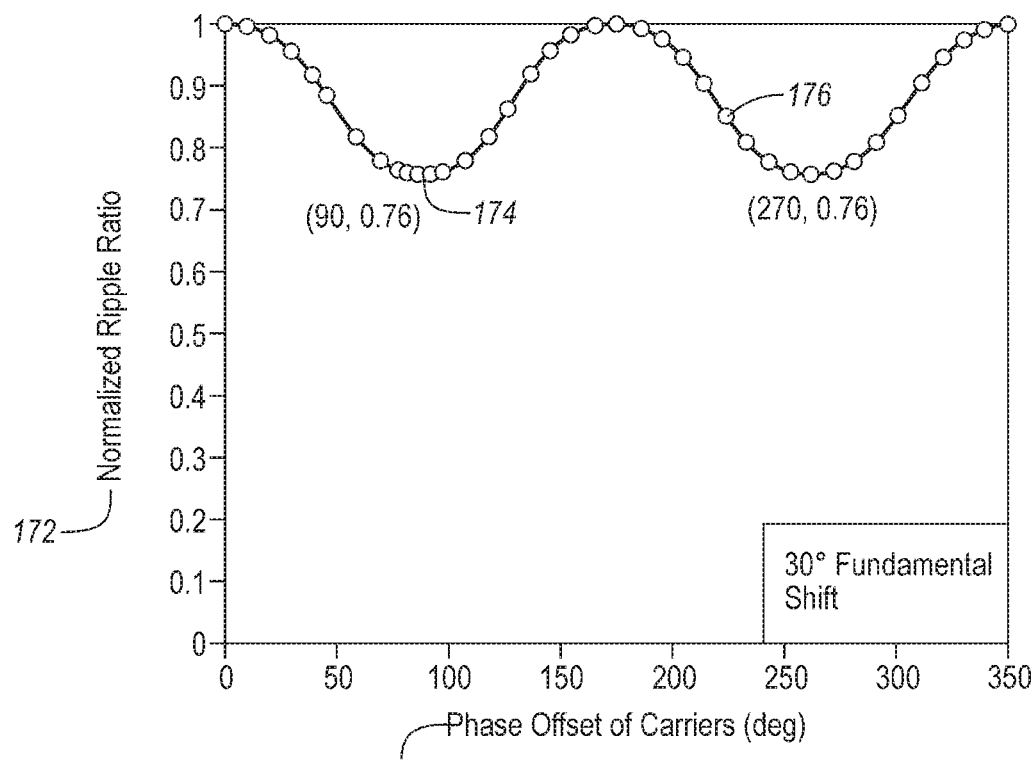
FIG. 5 is a graph showing local minima having normalized current ripple ratios over various carrier waveform phase offsets and having a fundamental waveform phase offset of 30°.

Now referring to FIG. 5, a graph is shown. The graph includes a normalized ripple ratio curve 176 corresponding to various carrier waveform phase offsets 170 and the respective normalized ripple ratio 172 at the given offsets 170. The normalized ripple ratio is calculated as an absolute value of the RMS current ripple through the DC bus divided by the absolute value of the RMS current ripple through the DC bus having a zero degree carrier shift and a 30° phase shift of the fundamental waveform. As shown, optimal carrier waveform phase offsets are 90° and 270°. Meaning, the carrier waveform used to generate the PWM signal for $U_1$ is offset from the carrier waveform used to generate the PWM of $U_2$ by 90° or 270° to minimize ripple current.

Figure 6:
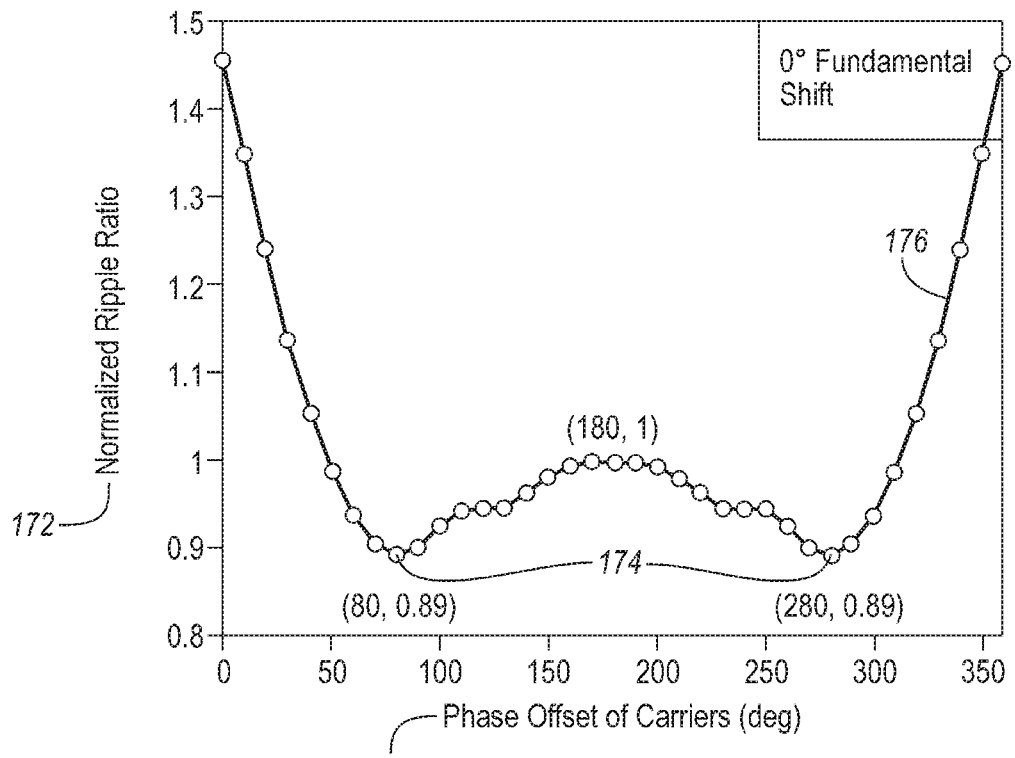
FIG. 6 is a graph showing local minima having normalized current ripple ratios over various carrier waveform phase offsets and having a fundamental waveform phase offset of 0°.

Now referring to FIG. 6, a graph is shown. The graph includes a normalized ripple ratio curve 176 corresponding to various carrier waveform phase offsets 170 and the respective normalized ripple ratio 172 at the given offsets 170. The normalized ripple ratio is calculated as an absolute value of the RMS current ripple through the DC bus divided by the absolute value of the RMS current ripple through the DC bus having a 180° carrier shift and a 0° phase shift of the fundamental waveform. As shown, optimal carrier waveform phase offsets are 80° and 280°. Meaning, the carrier waveform used to generate the PWM signal for $U_1$ is offset from the carrier waveform used to generate the PWM of $U_2$ by 80° or 280° to minimize ripple current.

Figure 7:
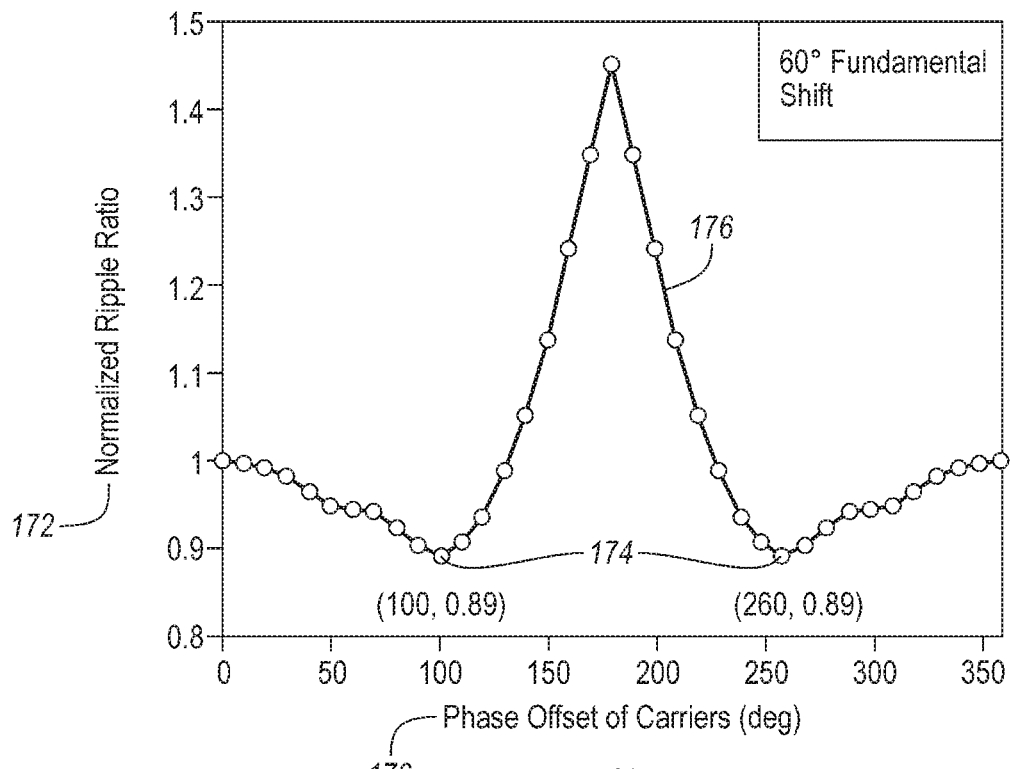
FIG. 7 is a graph showing local minima having normalized current ripple ratios over various carrier waveform phase offsets and having a fundamental waveform phase offset of 60°.

Now referring to FIG. 7, a graph is shown. The graph includes a normalized ripple ratio curve 176 corresponding to various carrier waveform phase offsets 170 and the respective normalized ripple ratio 172 at the given offsets 170. The normalized ripple ratio is calculated as an absolute value of the RMS current ripple through the DC bus divided by the absolute value of the RMS current ripple through the DC bus having a 0° carrier shift and a 60° phase shift of the fundamental waveform. As shown, optimal carrier waveform phase offset are 100° and 260°. Meaning, the carrier waveform used to generate the PWM signal for $U_1$ is offset from the carrier waveform used to generate the PWM of $U_2$ by 100° or 260° and the fundamental waveform used to generate the PWM signal for $U_1$ is offset from the fundamental waveform used to generate the PWM of $U_2$ by 60° to minimize ripple current. The windings of the electric machine must also be offset by 60° to ensure proper field generation by the fundamental waveform in the electric machine.

The aforementioned data can be stored in a lookup table or database as point data or regressed equations. The data can be combined with additional data related to modulation index and power factor, and speed information. A controller or computer can use the stored or determined information to optimize DC link ripple current by minimized the DC link ripple current and adjusting the parameters mentioned. For example, an electric machine having windings with a 60° offset may have pair of inverters having an offset fundamental gate driver waveform. The command speed of the electric machine may be 100 Hz. The controller may then adjust the offset of the carrier wave for each gate driver to minimize the DC link ripple current based on the predetermined regression equations or data points (e.g., set carrier waveforms to 100° out of phase for power factor of 0.68 and modulation index of 0.86). The controller may additionally adjust the phase shift angle in similar fashion based on the modulation index and power factor, speed data that is not shown.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    an electric machine including windings having a nonzero phase offset;
    first and second inverters configured to drive the electric machine as a result of toggling of switches according to respective pulse width modulation (PWM) signals; and
    one or more gate drivers configured to generate the PWM signals based on fundamental waveforms having a phase shift that is based on the nonzero phase offset and carrier waveforms having a carrier waveform phase offset that is based on a frequency and phase shift of the fundamental waveforms.

2. The vehicle of claim 1, wherein the carrier waveform phase offset is 80 degrees.

3. The vehicle of claim 1, wherein the carrier waveform phase offset is based on a power factor of output waveforms of the first and second inverters.

4. The vehicle of claim 1, wherein the carrier waveform phase offset is based on a modulation index of the fundamental waveforms.

5. The vehicle of claim 1, wherein the first and second inverters are powered by a direct current link capacitor.

6. The vehicle of claim 2, wherein the frequency is 100 Hz.

7. An electric drive system comprising:
    a DC link capacitor;
    a first inverter configured to draw power from the DC link capacitor and having switches toggled by a gate driver according to a first pulse width modulation (PWM) signal that is based on a first carrier waveform modulated by a first fundamental waveform; and
    a second inverter configured to draw power from the DC link capacitor and having switches toggled by the gate driver according to a second PWM signal that is based on a second carrier waveform having a second carrier waveform phase offset from the first carrier waveform and modulated by a second fundamental waveform phase offset from the first fundamental waveform, wherein the phase offset of the second carrier waveform is based on a variable fundamental frequency shared by the first fundamental waveform and the second fundamental waveform and the second carrier waveform phase offset is different for at least two frequencies of the variable fundamental frequency.

8. The electric drive system of claim 7, wherein the second carrier waveform phase offset is based on a power factor of an electric machine powered by the first and second inverters.

9. The electric drive system of claim 7, wherein the second carrier waveform phase offset is based on a phase offset of output waveforms of the first and second inverters.

10. The electric drive system of claim 7, wherein the second carrier waveform phase offset maintains a normalized link capacitor ripple current below 0.90.

11. The electric drive system of claim 7, wherein the phase offset is 80 degrees.

12. The electric drive system of claim 11, wherein the variable fundamental frequency is 100 Hz.

13. A vehicle comprising:
    an electric machine including windings;
    a pair of inverters drawing power from a common DC bus and configured to output alternating currents to the windings; and
    a pair of gate drivers configured to, in response to a projected ripple current of the common DC bus exceeding a threshold, offset respective phases of carrier waves associated with each of the gate drivers based on a speed of the electric machine.

14. The vehicle of claim 13, wherein respective phases of fundamental waveforms associated with the pair have a phase shift that is based on a nonzero phase offset of the windings.

15. The vehicle of claim 14, wherein the nonzero phase offset is 60°.

16. The vehicle of claim 15, wherein the pair of inverters are in parallel with a direct current link capacitor.

17. The vehicle of claim 15, wherein the carrier wave offset is 100°.

* * * * *